US012706320B2

(12) United States Patent
Kuehne et al.

(10) Patent No.: US 12,706,320 B2
(45) Date of Patent: Aug. 11, 2026

(54) CLAMPING AND HOLDING APPARATUS

(71) Applicant: ContiTech AG, Hannover (DE)

(72) Inventors: Lukas Kuehne, Seelze (DE); Philipp Freiheit, Hannover (DE); Stefan Granzow, Frankfurt (DE); Markus Ochs, Frankfurt am Main (DE); Stefan Narberhaus, Garbsen (DE)

( * ) Notice: Subject to any disclaimer, the term of this patent is extended or adjusted under 35 U.S.C. 154(b) by 591 days.

(21) Appl. No.: 18/041,685

(22) PCT Filed: Aug. 6, 2021

(86) PCT No.: PCT/EP2021/071979
§ 371 (c)(1),
(2) Date: Feb. 14, 2023

(87) PCT Pub. No.: WO2022/033970
PCT Pub. Date: Feb. 17, 2022

(65) Prior Publication Data

US 2023/0327168 A1 Oct. 12, 2023

(30) Foreign Application Priority Data

Aug. 14, 2020 (DE) ..................... 10 2020 210 372.0

(51) Int. Cl.
*H01M 8/248* (2016.01)
*F16B 2/08* (2006.01)

(52) U.S. Cl.
CPC ............... *H01M 8/248* (2013.01); *F16B 2/08* (2013.01)

(58) Field of Classification Search
None
See application file for complete search history.

(56) References Cited

U.S. PATENT DOCUMENTS

2011/0086292 A1 4/2011 Ko et al.
2011/0217617 A1 9/2011 Andreas-Schott et al.
(Continued)

FOREIGN PATENT DOCUMENTS

DE 102018210170 A1 12/2019
DE 102018210181 A1 12/2019
EP 3121478 A1 1/2017

OTHER PUBLICATIONS

International Search Report and Written Opinion dated Nov. 19, 2021 of International Application PCT/EP2021/071979 on which this application is based.

*Primary Examiner* — Colin W. Slifka
(74) *Attorney, Agent, or Firm* — Iken S. Sans; Richard A. Wolf; Gregory Adams

(57) ABSTRACT

The invention relates to a tensioning and holding apparatus (6) having at least one tensioning means (12*a*, 12*b*, 13*a*, 13*b*) for a cubic or cuboidal object (1) of variable geometry and/or dimensions that can be fixed by pretensioning, wherein the object has a respective end plate (4, 5) at two opposite ends. According to the object of the invention, this tensioning and holding apparatus should be able to be mounted particularly easily and be produced cost-effectively. To that end, it is provided that, at least at one of the end plates, two laterally opposite attachments (7, 8; 14, 15) that extend perpendicularly to the stacking and pretensioning direction (3) and parallel to one another and are intended to receive a respective associated holding rod (19, 20; 21, 22) are arranged or formed, that the attachments laterally protrude from the respective end plate, that the attachments, in their longitudinal direction, have cutouts (10*a*, 10*b*, 11*a*, 11*b*; 17*a*, 17*b*; 18*a*, 18*b*) for guiding one or more tensioning means (12*a*, 12*b*; 13*a*, 13*b*) that wrap around the holding rods and are in the form of endless (Continued)

Figure 1:
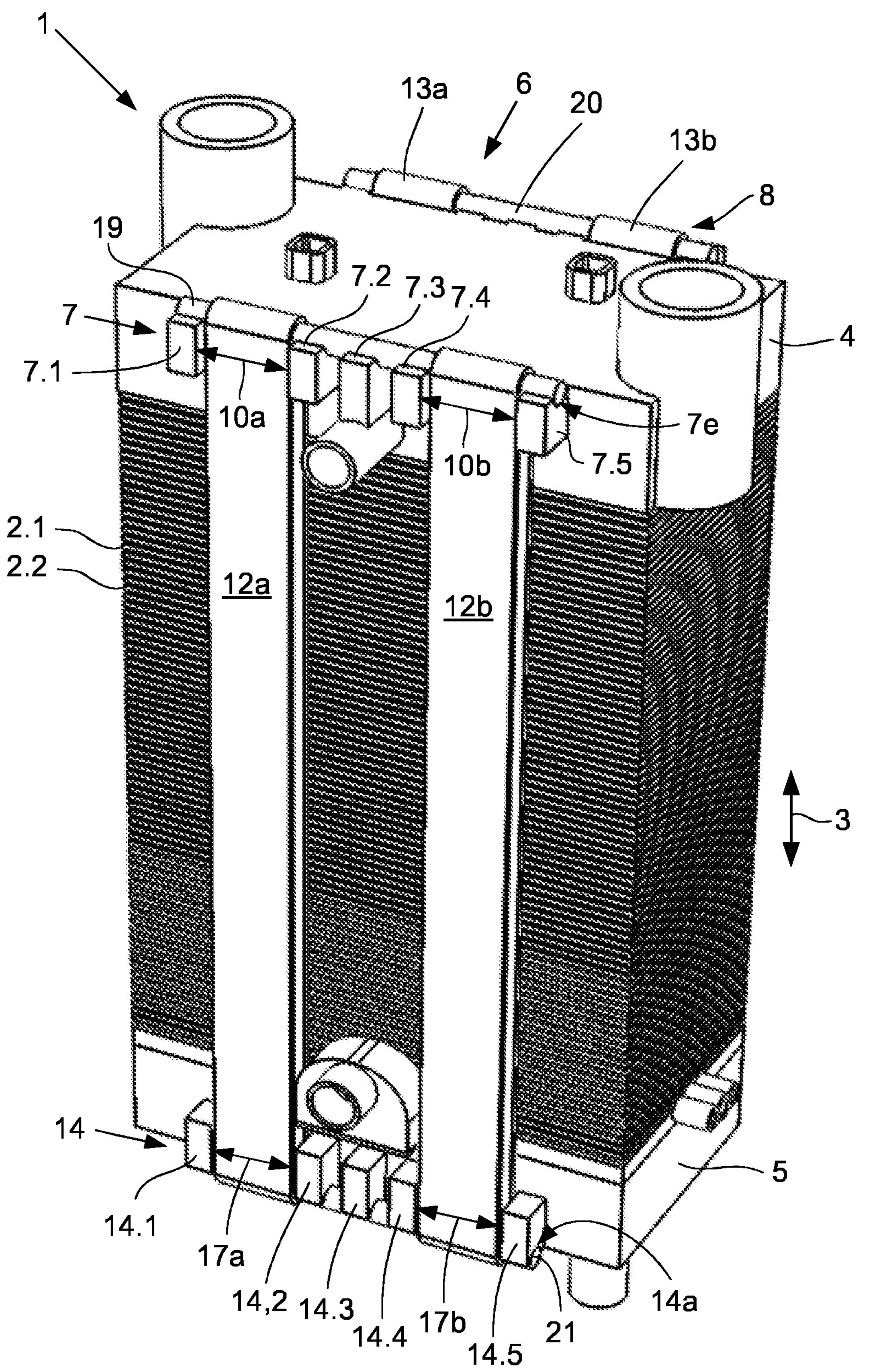

elastic bands, that the holding rods are in force-fitting engagement with the respective attachments (7, 8; 14, 15) in the pretensioned state of the object (1), and that the end plates (4, 5) are braced against one another by means of the at least one tensioning means (12*a*, 12*b*; 13*a*, 13*b*).

9 Claims, 4 Drawing Sheets

(56) References Cited

U.S. PATENT DOCUMENTS

| | | | |
|---|---|---|---|
| 2011/0294030 | A1 | 12/2011 | Yamamoto |
| 2021/0265649 | A1 | 8/2021 | Jilani et al. |
| 2021/0367258 | A1 | 11/2021 | Jilani et al. |

CLAMPING AND HOLDING APPARATUS

The invention relates to a tensioning and holding apparatus having at least one tensioning means for a cubic or cuboidal object of variable geometry and/or dimensions that can be fixed by pretensioning, wherein the object has a respective end plate at two opposite ends. The invention also relates to a method for mounting such a tensioning and holding apparatus and to a fuel cell stack that can be fixed and pretensioned by such a tensioning and holding apparatus.

Tensioning and holding apparatuses for tensioning objects are known in numerous embodiments. In the field of fuel cell production, tensioning and holding apparatuses are required to fix a fuel cell stack consisting of a multiplicity of individual cells which follow one another along a stacking direction. As a result of the electrical series connection of the individual cells, a high operating voltage that is necessary for many technical applications is achieved, for example several 100s of V in the motor vehicle sector. Usually, a respective end plate terminates the fuel cell stack at the end faces. Apart from current terminal contacts, these end plates generally have various terminals and leadthroughs for supplying or discharging fuel, exhaust gas and coolant, and also, if appropriate, fastening flanges. Such fuel cell stacks with end plates must be braced against one another with relatively high pretensioning forces in order to ensure satisfactory operation of the fuel cell stack in terms of tightness and electrical connectivity.

Since the fuel cell stack expands during operation as a result of the temperature, the tensioning and holding apparatus should on the one hand have a high degree of reliability against breakage or tearing, but on the other hand allow not inconsiderable variation in the geometry and/or dimensions of the fuel cell stack by virtue of resilient properties, without exceeding a tolerance range of the required tensile force in the process. To pretension a fuel cell stack, it is known to brace the end plates against one another with encircling or partially encircling tensioning bands of steel or plastic.

DE 10 2006 028 498 B4 thus discloses a fuel cell stack with a tensioning device, in the case of which multiple tensioning bands of steel or plastic extend around an end plate and are fastened to an opposite end plate by way of each of their ends. Resilient length-equalizing elements are integrated in the tensioning bands in order to compensate different longitudinal expansions of the fuel cell stack and of the tensioning bands during operation, and nevertheless be able to generate a sufficiently high contact force or sealing force between the fuel cell units by means of the tensioning apparatus.

Moreover, tensioning apparatuses for fuel cell stacks are known that consist of a combination of tie rods of steel and spring elements such as plate springs, wherein the tie rods are each fastened to the two end plates.

DE 10 2017 212 085 A1 discloses a fuel cell stack having a tensioning apparatus comprising two or more crossmembers, which extend at least approximately perpendicularly to the stacking direction, and wherein at least one crossmember is arranged at each end of the fuel cell stack. The crossmembers can be drawn together by means of tensioning elements, such as threaded rods, which are screwed to the crossmembers, in order to apply tension to the fuel cell stack, wherein the crossmembers are resiliently connected to the end plates of the fuel cell stack via plate springs.

Further tensioning apparatuses for fuel cell stacks having individual spring elements or sets of spring elements, such as plate springs or helical springs, are known from DE 10 2016 122 442 A1 and DE 10 2012 219 022 A1.

The known tensioning apparatuses for fuel cell stacks, which use combinations of non-expandable bands, such as steel bands, rigid tensioning frames or tensioning housings, on the one hand, and spring elements, on the other hand, in order to fix an object having components of variable geometry and/or dimensions, in particular a fuel cell stack, and at the same time to enable expansion of the fuel cell stack and maintain a certain pretension, usually give rise to a comparatively high additional cost factor in the production of the fuel cell. In addition, tensioning apparatuses of this type not inconsiderably increase the dead weight of a fuel cell stack.

Against this background, the invention was based on the object of proposing a tensioning and holding apparatus for a cubic or cuboidal object which can be fixed by pretensioning and the geometry or at least the spacing of the components of which vary in relation to one another. This tensioning and holding apparatus should be able to be mounted easily and operationally reliably and produced cost-effectively. In particular, such a tensioning and holding apparatus should be suitable for securely fixing and pretensioning a fuel cell stack. A further object is to specify a method for mounting such a tensioning and holding apparatus. Lastly, the intention is to present a fuel cell stack which is held together elastically by means of a tensioning and holding apparatus according to the invention.

These objects are achieved by the features of the independent claims, while advantageous configurations and refinements of the invention are defined in the associated dependent claims.

The invention therefore relates first of all to a tensioning and holding apparatus having at least one tensioning means for a cubic or cuboidal object of variable geometry and/or dimensions that can be fixed by pretensioning, wherein the object has a respective end plate at two opposite ends.

To achieve the stated object in terms of the provision of a tensioning and holding apparatus, the invention provides that, at least at one of the end plates, two laterally opposite attachments that extend perpendicularly to the pretensioning direction and parallel to one another and are intended to receive a respective associated holding rod are arranged or formed, that the attachments laterally protrude from the end plate, that the attachments, in their longitudinal direction, have cutouts for guiding one or more tensioning means that wrap around the holding rods and are in the form of endless elastic bands, that the holding rods are in force-fitting engagement with the respective attachments in the pretensioned state of the object, and that the end plates are braced against one another by means of the at least one tensioning means.

The following clarification regarding terminology should be noted: A tensioning means is a flat, endless elastic band or a flat, endless elastic belt, for example made of ethylene-propylene-diene elastomer (EPDM). A holding rod is, in comparison with its diameter, an elongate element, for instance a staff or a shaft, for example having a circular or circle-like cross-sectional geometry. In connection with the invention that is to be explained, an attachment is an elongate lateral projection on an end plate for an object to be braced, or for a fuel cell stack to be braced. In the case of a cuboidal end plate, such an attachment is formed or arranged preferably on its longitudinal side. Such an end plate preferably has such an attachment on each of its two longitudinal sides. Each attachment has a channel for receiving a holding rod, wherein this channel is subdivided into individual portions by cutouts in the attachment for letting tensioning means pass through. The respective channel has, for example, a semicircular, U-shaped or V-shaped geometry. A mounting tool is an elongate tubular or channel-like element, for example a hollow shaft or the like, the inside diameter of which is larger than the outside diameter of the holding rod assigned to this mounting tool. The mounting tool serves to temporarily receive the holding rod for mounting purposes.

Moreover, the following observation should be noted. The terms "upper" and "lower" and their derivatives that are used in the following description and are indicative of directions serve merely for easy orientation when viewing a fuel cell stack in the figures. Similarly, the terms "left" and "right" can be used synonymously.

The proposed tensioning and holding apparatus is easy and cost-effective to produce and can be mounted with few mounting steps. The attachments are preferably incorporated on the end plates in one piece. The end plates with the attachments incorporated thereon may be injection molded parts of metal or plastic, but may also be produced by milling. Only the associated holding rods and the elastic tensioning means need to be in the form of separate components, with the result that the otherwise routine costs for tensioning tools are also omitted. In addition, the mounting outlay is also low.

The proposed tensioning and holding apparatus can advantageously be used in particular to securely fix and pretension a fuel cell stack. Suitable endless elastic bands with the required specifications in terms of size, strength, durability and chemical resistance are relatively cost-effectively available on the market and additionally have a lower dead weight than arrangements with steel bands and spring sets.

In principle, however, the use of a tensioning and holding apparatus according to the invention is not limited to fuel cell stacks, but is also suitable for bracing any desired objects of variable geometry and/or dimensions by means of elastic bands, on which the attachments for the tensioning means according to the invention are arranged or to which they can be fastened, and in the case of which a constant pretensioning force is to be reached and at the same time for example an expansion of the object of variable geometry is to be allowed.

According to a first embodiment developed further in design terms, it is provided that, at each end plate, two respective laterally opposite attachments for receiving a respective associated holding rod are arranged or formed, and that a respective attachment of an end plate is braced against an opposite attachment of the other end plate by means of at least one respective tensioning means in the pretensioned state of the object.

Accordingly, the end plates, with the object arranged in between, can be braced against one another on two sides by way of at least one respective tensioning means. The tensioning means are thus not wrapped around the object. Or, in other words: no tensioning means is guided beyond one of the end plates. This results in the free surfaces of the two end plates being available without limitation for the arrangement of electrical contacts, various terminals and lead-throughs for the supply and discharge of fuel, exhaust gas and coolant, and for the installation of fastening flanges. In addition, there is installation space on the two end plates for direct incorporation of sensors on the end plates, for example for measuring pressures and temperatures. Moreover, secure fixing of the object is achieved by means of an areally evenly distributed tensioning force on the object.

According to a second embodiment, it may be provided that, at only one of the two end plates, two laterally opposite attachments for receiving a respective associated holding rod are arranged or formed, and that the two attachments of the end plate are braced against one another by means of at least one tensioning means in the pretensioned state, wherein the at least one tensioning means wraps around the opposite other end plate.

In this particularly simple arrangement, design measures, specifically the installation or formation of two lateral attachments, are accordingly necessary only at one end plate. The second end plate may be an unmodified, conventional end plate. In addition, only two holding rods for the two attachments of the one end plate are necessary. This lowers the number of components and the dead weight of the apparatus still further and additionally reduces the production costs. The tensioning means is accordingly guided over the second end plate and hooked under tension into the two attachments of the first end plate by means of the holding rods.

According to an advantageous refinement of this arrangement, it may be provided that the second end plate, around which the at least one tensioning means is wrapped, has a guiding aid, at least in a surface region of said end plate over which the at least one tensioning means runs. This guiding aid may, for example, be a guide rail or the like. A curved surface, or one which is rounded in the edge regions, of the end plate is also possible. This reliably avoids the tensioning means slipping on the end plate around which it is wrapped during mounting or operation. The tensioning means can accordingly make close contact with the free surface of the second end plate. In this respect, a curvature or rounding of the edges of the respective end plate ensures that the respective tensioning means is not mechanically overloaded by a linear action of force. A further advantage is that, as a result of such a curvature geometry, the tension profile in the respective end plate and the deformation thereof are optimized in terms of requirements established beforehand.

Another embodiment provides that multiple tensioning means, in the form of endless belts, are arranged next to one another on a holding rod. For the one part, this makes it possible to generate particularly high tensioning forces. For the other part, a particularly uniform force distribution over the pretensioned object is achieved.

It may also be provided that means for retensioning the object are formed on or fastened to at least one attachment and/or at least one holding rod. This makes it possible to set the pretensioning of the object precisely and correct it at any time if required.

In an advantageous embodiment, this can be achieved in that a first means for retensioning the object is a holding rod, which is in the form of a shaft with an eccentric cross-sectional geometry. In a correspondingly formed attachment, the holding rod can be rotated about its longitudinal axis and fixed in a rotated position. This makes it possible to expand the tensioning means placed on the holding rod to a greater or lesser extent and to increase or reduce the tensile force exerted on the object by the tensioning means in accordance with the expansion of the tensioning means. This arrangement allows correction of the tensioning force both in a loosening direction, that is to say one with lower pretensioning, and in a tightening direction, that is to say one with higher pretensioning of the object.

A particularly simple means for retensioning the object that can be provided is a spacer, which can be inserted into the attachment between a depression or channel of the attachment and the holding rod in order to expand the tensioning means placed on the holding rod to a greater extent and to increase the tensile force exerted on the object by the tensioning means.

To mount a tensioning and holding apparatus designed according to the invention on a cubic or cuboidal object of variable geometry and/or dimensions that is covered with a respective end plate at the ends, the invention provides the three method variants described below:

Mounting steps according to variant no. 1:

a) placing at least one respective endless elastic tensioning means having an undersize onto a first upper holding rod and a second upper holding rod, and also onto an associated first lower holding rod and an associated second lower holding rod, b) inserting the two upper holding rods at a first end plate into the first attachment therefor and into the second attachment therefor, c) pretensioning the object by means of the action of a force on one of the end plates, d) inserting the two lower holding rods at the second end plate into the third attachment therefor and into the fourth attachment therefor, e) relieving the force on the end plate.

Mounting steps according to variant no. 2:

f) placing at least one respective endless elastic tensioning means having an undersize onto a first upper holding rod and a second upper holding rod, g) placing the at least one tensioning means resting on the first upper holding rod onto a first tubular or channel-like mounting tool, h) placing the at least one tensioning means resting on the second upper holding rod onto a second tubular or channel-like mounting tool, i) inserting the two upper holding rods at the first end plate into a first attachment there and into a second attachment there, j) pretensioning the object by means of the action of a force on one of the end plates, k) inserting the first mounting tool, carrying along the tensioning means resting thereon, at the second end plate into a third attachment there, and inserting the second mounting tool, carrying along the tensioning means resting thereon, at the second end plate into a fourth attachment there, l) introducing a first lower holding rod into the first mounting tool and a second lower holding rod into the second mounting tool, m) removing the two mounting tools, leaving behind the two lower holding rods and the tensioning means, from the associated attachment at the second end plate, n) relieving the force on the end plate.

Mounting steps according to variant no. 3:

o) placing at least one endless elastic tensioning means having an undersize onto a first holding rod, p) inserting the first holding rod at the first end plate into a first attachment, q) pretensioning the object by means of the action of a force on one of the end plates, r) placing the at least one endless elastic tensioning means onto a second holding rod and guiding it, carrying along the at least one tensioning means, beyond the second end plate and back to the first end plate, and there placing the second holding rod into the second attachment of the first end plate, s) only in the event of a mounting tool being used: introducing a respective holding rod into the associated mounting tool, inserting the mounting tool into an associated attachment, and, after method step r), removing the mounting tool, leaving behind the holding rod and the tensioning means, from the respective attachment, t) relieving the force on the end plate.

A combination of the mounting steps of these three variants is possible, specifically depending on whether and how many mounting tools are used.

Accordingly, the mounting of a tensioning and holding apparatus according to the invention for pretensioning and fixing a fuel cell stack with an upper end plate and a lower end plate can, for example, be carried out as follows: Multiple endless elastic bands, for example a first endless elastic band and a second endless elastic band, are placed next to one another onto a first holding rod at an upper suspension point (upper, first end plate) and onto a first mounting tool at a lower suspension point (lower, second end plate). In the case of such a largely annular endless band, this is done by placing the respective holding rod or the mounting tool against the radial inner side of the endless band. As an alternative to this, it is possible, without using the first mounting tool, to place the two first and second endless bands directly onto a third holding rod at the lower suspension point.

Similarly, a third endless elastic band and a fourth endless elastic band are placed next to one another onto a second holding rod at an upper suspension point (upper, first end plate) and onto a second mounting tool at a lower suspension point (lower, second end plate). As an alternative to this, it is possible, likewise without using the second mounting tool, to place the two third and fourth endless bands directly onto a fourth holding rod at the lower suspension point.

The holding rods and mounting tools that are equipped in this way at the upper suspension points are inserted into the relevant attachments at the upper end plate. The positioning of the endless bands and the guidance and securing of the holding rods and the mounting tools can be effected manually with a simple tool or can be automated, for example using a robot arm and/or using a spindle drive.

Then, the fuel cell stack, by way of an areal force-induced loading, such as for example by lowering a defined mass or exerting a defined hydraulic pressure, is applied to an end plate, for example to the upper end plate, and resiliently compressed as a result.

In a subsequent step, the holding rods and mounting tools are positioned in their final position in the attachments of the lower end plate. If necessary, the tensioning means can be additionally expanded to insert the holding rods and mounting tools into the attachments of the lower end plate using an expansion tool.

If mounting tools are used and it has not happened yet, it is then possible to introduce the third holding rod and the fourth holding rod into the first mounting tools and into the second mounting tools, which indeed preferably have a tubular form. After positioning the holding rods mentioned, the associated mounting tools are withdrawn from the attachments, leaving behind the lower holding rods and the tensioning means, or endless bands. If necessary, the contact surfaces of the mounting tools can be treated with a lubricant in advance, in order to minimize the friction when the mounting tools are being removed from the holding rods and the tensioning means.

Lastly, the mentioned force-induced loading of the fuel cell stack is ended, and the fuel cell stack is thus relieved of load, with the result that the fuel cell stack expands, but without reaching its original, non-pretensioned axial length. The holding rods then sit in a force-fitting manner in the respectively associated attachments at both end plates by virtue of the endless bands that are now tensioned on account of their undersize. In the process, the fuel cell stack is fixed between the two end plates under pretensioning. Advantageously, the endless bands are designed such that a predefined resulting pretensioning force of the pretensioned fuel cell stack is achieved.

For the case in which only one end plate, for example only the upper end plate, has laterally protruding attachments, the mounting can deviate from the last-described procedure. In that case, multiple endless elastic bands, for example a first endless elastic band and a second endless elastic band, are placed next to one another around a first holding rod in the region of a first attachment of the upper end plate and around a second holding rod in the region of a lower suspension point. After the action of a normal force on one of the end plates or on the fuel cell stack, the endless bands are wrapped around the second, lower end plate, guided back to the first, upper end plate and fastened to the laterally opposite second attachment by means of the second holding rod at the upper end plate.

Lastly, the invention also relates to a fuel cell stack, having a tensioning and holding apparatus for pretensioning and fixing said fuel cell stack, the tensioning and holding apparatus being designed as claimed in one of the apparatus claims and being mountable as claimed in at least one of the method claims.

Figure 2:
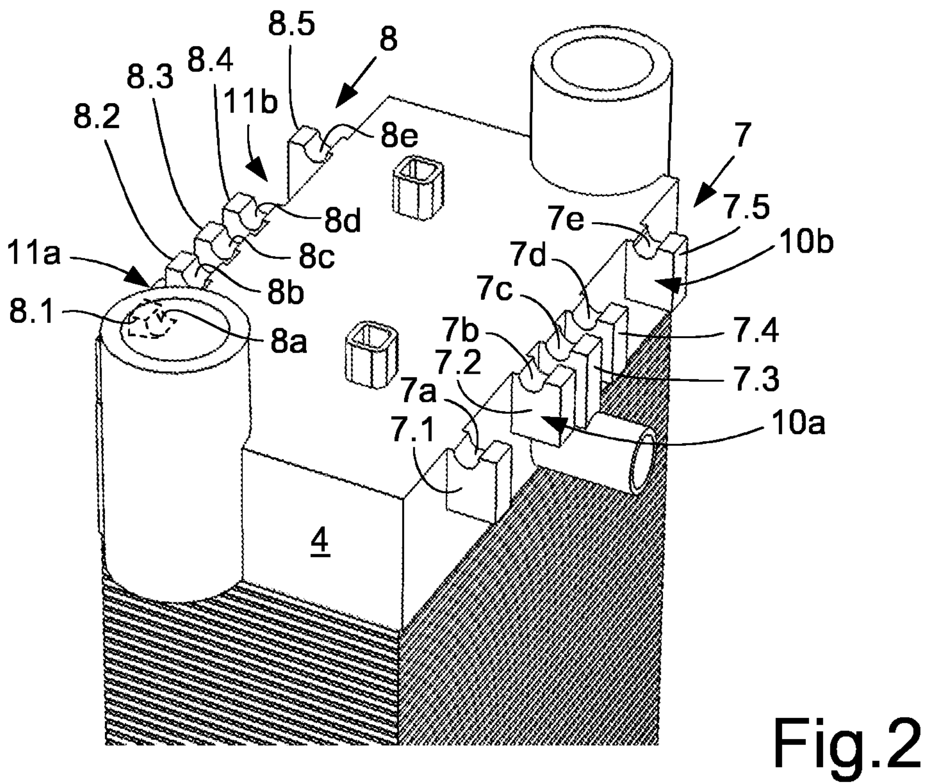
Figure 5:
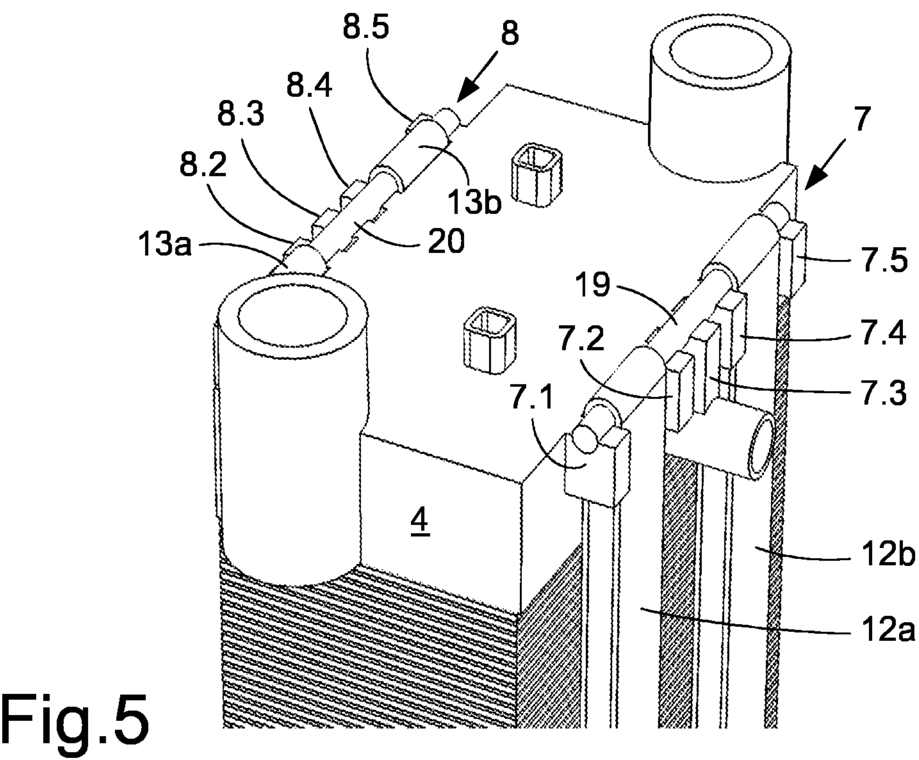
Figures 3, 4:
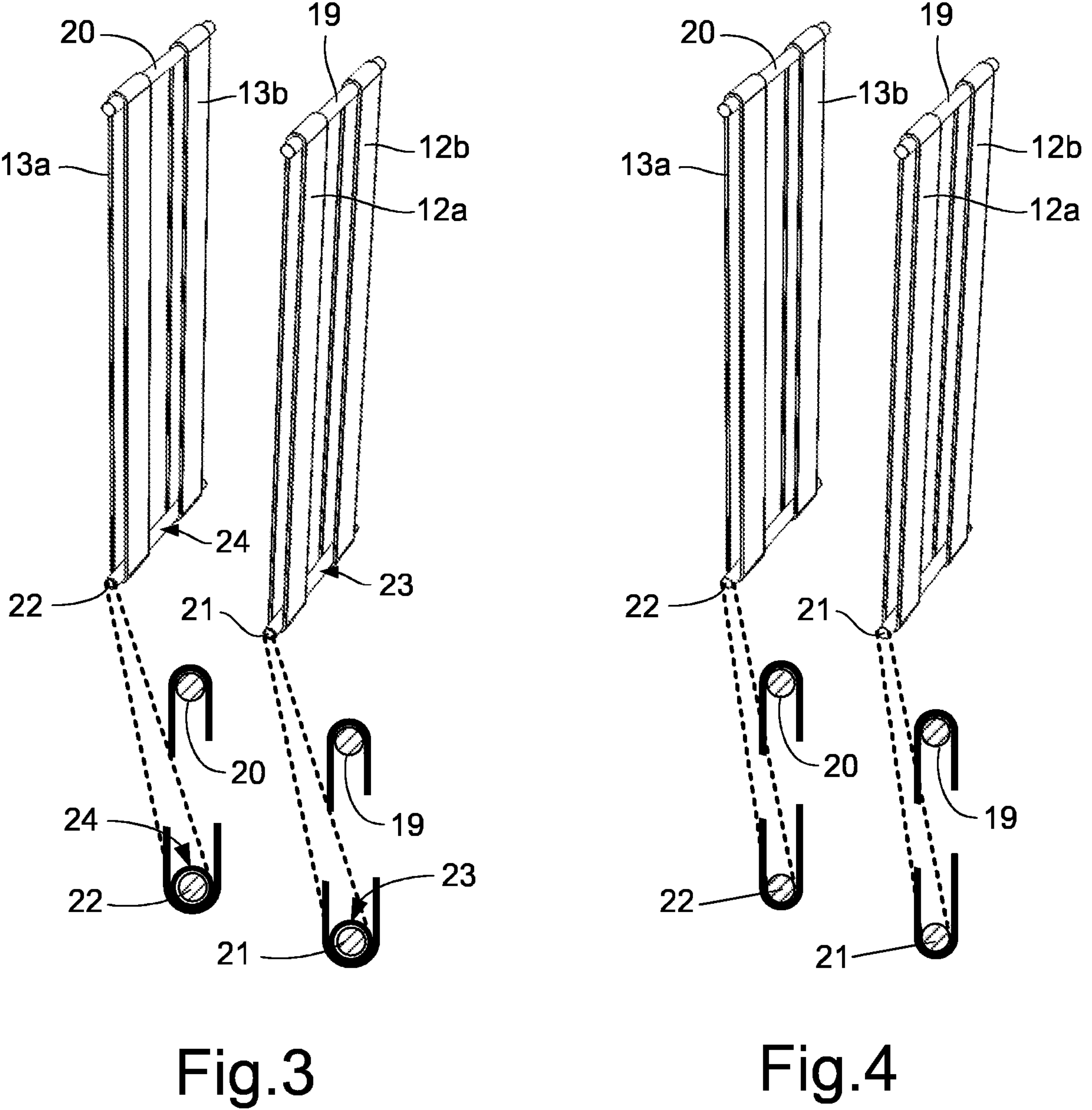
Figure 6:
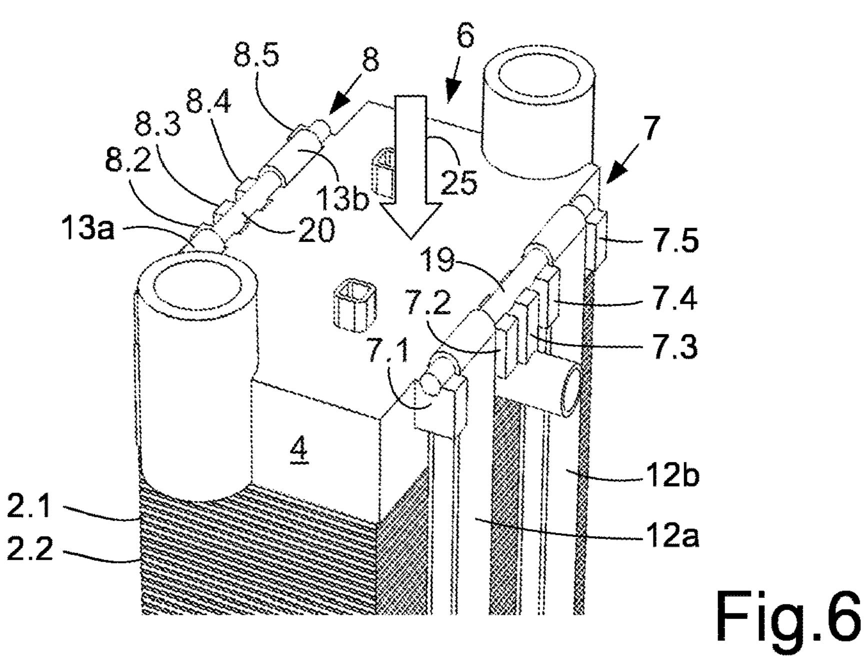
Figure 7:
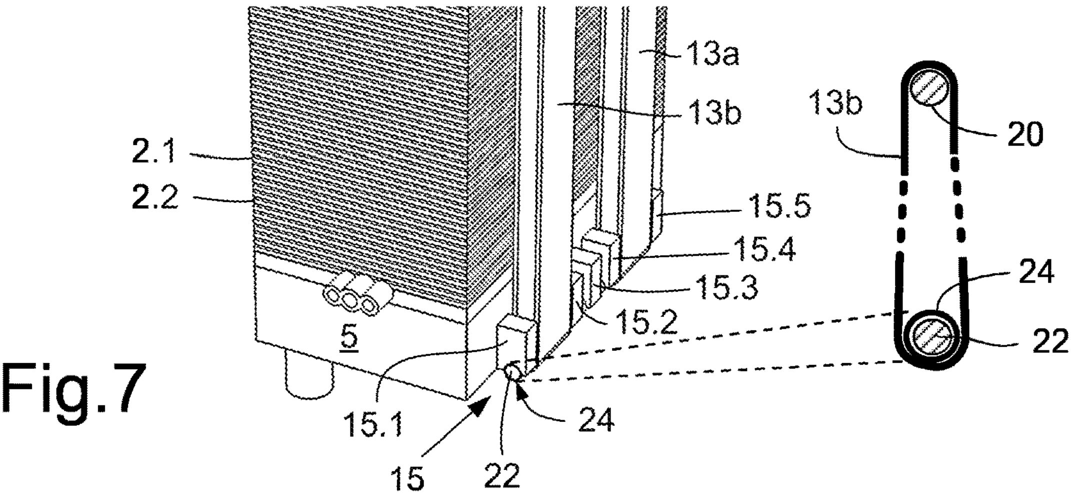
Figure 8:
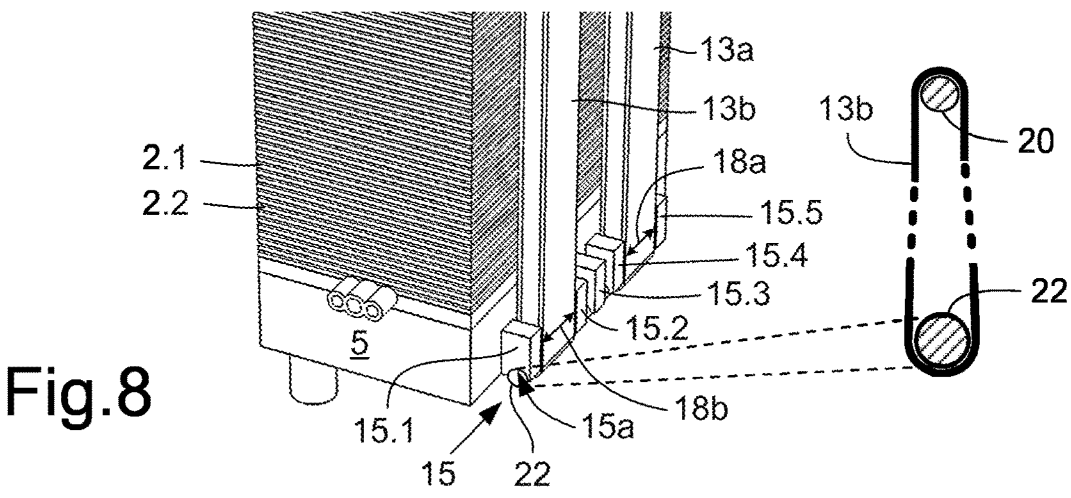

The invention will be discussed in more detail below on the basis of exemplary embodiments illustrated in the appended drawing, in which:

FIG. 1 shows a perspective overview illustration of a fuel cell stack having an upper end plate and a lower end plate, and having a tensioning and holding apparatus according to the invention in the mounted state, FIG. 2 shows a plan view of the fuel cell stack according to FIG. 1 with the upper end plate having two lateral attachments, before mounting the tensioning and holding apparatus, FIG. 3 shows a view of a detail of two respective endless elastic bands, each suspended on an upper holding rod at an upper imaginary suspension point and on a mounting tool with a lower holding rod received therein at a lower imaginary suspension point, FIG. 4 shows a view of a detail of the endless bands according to FIG. 3 with a respective upper holding rod and lower holding rod, but without a mounting tool, FIG. 5 shows a plan view of the fuel cell stack and the upper end plate according to FIG. 2, but with holding rods inserted in the attachments of the upper end plate and the two respective endless elastic bands suspended therefrom, FIG. 6 shows an illustration of the fuel cell stack according to FIG. 5 with holding rods inserted in the attachments of the upper end plate and respective endless elastic bands suspended therefrom with a normal force acting on the upper end plate, FIG. 7 shows a perspective partial view of the fuel cell stack according to FIG. 1 with the lower end plate and a lateral attachment which can be seen there, and with a tubular mounting tool inserted in a channel of the attachment with a lower holding rod coaxially received therein, and with the endless elastic bands suspended therefrom after the tensioning and holding apparatus has been mounted, with the two holding rods and one endless band also being illustrated schematically next to it on the right, and FIG. 8 shows the lower end plate with the holding rod inserted in an attachment, and with the endless bands suspended therefrom after removing the mounting tools and relieving a force in the pretensioned state of the fuel cell stack, with the two holding rods and one endless band also being illustrated schematically next to it on the right.

Some components in the figures match, and therefore these are denoted by the same reference numerals.

Accordingly, the cuboidal fuel cell stack 1 illustrated in FIG. 1 has a multiplicity of individual cells 2.1, 2.2, which form the fuel cell stack 1 when stacked one on top of another longitudinally in relation to a stacking and pretensioning direction 3. The individual cells 2.1, 2.2 are held at the end face by a first end plate 4, referred to as upper end plate 4 below, and a second end plate 5, referred to as lower end plate 5 below, and pretensioned in the stacking and pretensioning direction 3 mentioned by means of a tensioning and holding apparatus 6, which is yet to be described in more detail. The two end plates 4, 5, in a manner known per se, have electrical contacts and various leadthroughs for the supply and discharge of fuel, exhaust gas and coolant, and fastening flanges. These terminals are not a subject of the invention and are therefore not described in more detail.

At the upper end plate 4, the tensioning and holding apparatus 6 has a first attachment 7 and a second attachment 8, which are arranged laterally opposite and parallel to one another and each of which protrudes from the upper end plate 4 in a transverse direction. The upper end plate 4 and its two attachments 7, 8 are produced in one piece from a plastic or a plastic-aluminum composite in an injection molding method.

As shown in more detail primarily in FIG. 2, the two attachments 7, 8 at the upper end plate 4 each consist of five transverse webs 7.1, 7.2, 7.3, 7.4, 7.5; 8.1, 8.2, 8.3, 8.4, 8.5, in which a respective channel 7*a*, 7*b*, 7*c*, 7*d*, 7*e*; 8*a*, 8*b*, 8*c*, 8*d*, 8*e* in the form of a half shell is made. The circumferential openings in the upper channels 7*a*, 7*b*, 7*c*, 7*d*, 7*e* in the form of half shells each face upward away from the individual cells 2.1, 2.2, while the circumferential openings in the lower channels 8*a*, 8*b*, 8*c*, 8*d*, 8*e* in the form of half shells each face downward. In this respect, the two attachments 7, 8 are integral constituent parts of the upper end plate 4. Cutouts 10*a*, 10*b*, 11*a*, 11 *b* are formed between the first transverse web 7.1 and the second transverse web 7.2 and also between the fourth transverse web 7.4 and the fifth transverse web 7.5 of the first attachment 7, and between the first transverse web 8.1 and the second transverse web 8.2 and also between the fourth transverse web 8.4 and the fifth transverse web 8.5 of the second attachment 8, respectively. These cutouts 10*a*, 10*b*, 11*a*, 11 *b* serve for the passage of tensioning means 12*a*, 12*b*, 13*a*, 13*b* in the form of endless elastic belts, which inter alia can be seen in FIG. 1. In the present case, two respective tensioning means 12*a*, 12*b*, 13*a*, 13*b* arranged next to one another are present.

Integrally formed in one piece on the lower end plate 5 in the same way are a third attachment 14 (see FIG. 1) and a fourth attachment 15 (see FIG. 7), which are aligned parallel to one another and protrude laterally from the lower end plate 5.

The two attachments 14, 15 at the lower end plate 5 each consist of five transverse webs 14.1, 14.2, 14.3, 14.4, 14.5; 15.1, 15.2, 15.3, 15.4, 15.5, in which a respective channel 14*a*; 15*a* in the form of a half shell is likewise made. The circumferential openings in these channels 14*a*; 15*a* in the form of half shells clearly each face downward away from the individual cells 2.1, 2.2. The two attachments 14, 15 are integral constituent parts of the lower end plate 5.

Cutouts 17*a*, 17*b*; 18*a*, 18*b* are formed between the first transverse web 14.1 and the second transverse web 14.2 and also between the fourth transverse web 14.4 and the fifth transverse web 14.5 of the first lower attachment 14, and between the first transverse web 15.1 and the second transverse web 15.2 and also between the fourth transverse web 15.4 and the fifth transverse web 15.5 of the second lower attachment 15, respectively. These cutouts 17*a*, 17*b*; 18*a*, 18*b* serve for the passage of the mentioned tensioning means 12*a*, 12*b*, 13*a*, 13*b* in the form of endless elastic belts. The perspectively concealed, rear lower attachment 15, which is not visible in FIG. 1, and its two cutouts 18*a*, 18*b* can be seen in FIG. 8 in an illustration rotated about the vertical axis. Of the lower channels, only one channel 15*a* is provided with a reference sign in FIG. 8.

Each of the four attachments 7, 8; 14, 15 is assigned a respective holding rod 19, 20, 21, 22. These holding rods 19, 20, 21, 22 serve to hold the tensioning means 12*a*, 12*b*, 13*a*, 13*b* and in the present case are in the form of round rods, which are inserted in a form-fitting manner in the channels 7*a*, 7*b*, 7*c*, 7*d*, 7*e*; 8*a*, 8*b*, 8*c*, 8*d*, 8*e*; 14*a*; 15*a* in the form of half shells of the associated upper and lower attachments 7, 8; 14, 15, respectively.

While FIG. 1 shows the fuel cell stack 1 in the fully mounted and pretensioned state, the individual mounting steps for the tensioning and holding apparatus 6 will be described below with reference to FIGS. 2 to 8.

Accordingly, FIG. 2 shows a perspective plan view of the upper end plate 4 of the fuel cell stack 1 before mounting the tensioning and holding apparatus 6. What can be clearly seen are the first attachment 7 and the second attachment 8 of the upper end plate 4 with their depressions or channels 7*a*, 7*b*, 7*c*, 7*d*, 7*e*; 8*a*, 8*b*, 8*c*, 8*d*, 8*e* in the form of half-shells ready to receive the first and second holding rod 19, 20, respectively.

FIG. 3 shows a first tensioning means 12*a* and a second tensioning means 12*b*, which are suspended spaced apart from one another but next to one another on the first holding rod 19 and on a first mounting tool 23. The first mounting tool 23 is substantially in the form of a hollow shaft or tubular, and the third, lower holding rod 21 is inserted in it with radial play. The first mounting tool 23 serves to simplify the mounting and to tension the tensioning and holding apparatus 6 on the fuel cell stack 1. This first tensioning means arrangement according to FIG. 3 is prepared for suspension into the first attachment 7 at the upper end plate 4, on the one hand, and into the third attachment 14, on the same side, at the lower end plate 5 (see FIG. 1).

Similarly, FIG. 3 shows a second tensioning means arrangement with a third tensioning means 13*a* and a fourth tensioning means 13*b*, which are suspended spaced apart from one another but next to one another at the top on the second holding rod 20 and at the bottom on a second mounting tool 24, with the fourth holding rod 22 introduced therein. This second tensioning means arrangement is prepared for suspension into the second attachment 8 at the upper end plate 4, on the one hand, and for suspension into the fourth attachment 15, on the same side, at the lower end plate 5 (see FIG. 7).

In the same way as FIG. 3, FIG. 4 shows the two tensioning means arrangements, but prepared for an alternative mounting method, in which mounting aids, that is to say the mounting tools 23, 24, as illustrated are dispensed with for the purpose of suspension at the lower end plate 5.

FIG. 5 shows the two mentioned tensioning means arrangements with the first holding rod 19 and the second holding rod 20, which are inserted in the first attachment 7 and in the second attachment 8, respectively, at the upper end plate 4. At this point in time, these two tensioning means arrangements may have not yet been suspended, or may have been suspended at most by means of a strong overexpansion of the tensioning means 12*a*, 12*b*; 13*a*, 13*b*, in the third attachment 14 and in the fourth attachment 15 at the lower end plate 5, since the length of the tensioning means 12*a*, 12*b*, 13*a*, 13*b* in the form of elastic bands is designed with an undersize. Therefore, the axial distance between the two end plates 4, 5 in a subsequent mounting step first of all must be reduced by a pressing device, which is not illustrated.

FIG. 6 indicates the action of a normal force 25 on the upper end plate 4 in the stacking and pretensioning direction 3. This application of force presses the stack with the individual cells 2.1, 2.2 together, with the result that the axial length of the fuel cell stack 1 decreases as required.

As FIG. 7 shows, in the next method step it is now possible to suspend the two tensioning means arrangements into the associated attachments 14, 15 at the lower end plate 5 by means of the two mounting tools 23, 24. The associated holding rods 21, 22 can selectively have been introduced into the mounting tools 23, 24 already beforehand, or only introduced therein subsequently, that is to say after the mounting tools 23, 24 have been suspended into the attachments 14, 15 of the lower end plate 5.

Lastly, FIG. 8 shows the mounted state, in which the mounting tools 23, 24 have already been drawn away coaxially from the holding rods 21, 22, with the result that all the holding rods 19, 20, 21, 22 with the tensioning means 12*a*, 12*b*, 13*a*, 13*b* suspended therefrom engage in the associated attachments 7, 8; 14, 15. The action of the normal force 25 on the upper end plate 4 can now be ended, with the result that the fuel cell stack 1 attempts to expand in the stacking and pretensioning direction 3. The expansion travel is delimited by means of the tensile force, counteracting the expansion of the fuel cell stack 1, of the expanded tensioning means 12*a*, 12*b*, 13*a*, 13*b* of the tensioning and holding apparatus 6, as a result of which the individual cells 2.1, 2.2 are securely braced against one another and fixed by the two end plates 4, 5, and permanent tightness and electrical connectivity of the fuel cell stack 1 is ensured.

In a simple variant, not illustrated, of the exemplary embodiment shown, the lower end plate 5 does not have any attachments. In this case, the two elastic tensioning means 12*a*, 12*b*, which rest on the first and third holding rods 19, 21, may have a lengthened form. The tensioning means arrangement lengthened in this way wraps around the lower end plate 5 and is suspended at the upper end plate 4 from its first attachment 7 and second attachment 8 with tension, with the result that the two end plates 4, 5 are braced against one another with a pretensioning force.

Lastly, a retensioning device, not illustrated, should also be mentioned. Accordingly, in the case of one embodiment, one or more attachments 7, 8, 14, 15 at the end plates 4, 5 and/or one or more holding rods 19, 20, 21, 22 held there can have eccentric cross sections and securing means for securing the holding rods 19, 20, 21, 22 in the direction of rotation about their longitudinal axis. By rotating the relevant holding rods 19, 20, 21, 22 about their longitudinal axis in the attachments 7, 8; 14, 15 and securing same in the rotated position, the pretensioning of the fuel cell stack 1 can be subsequently changed, that is to say increased or decreased. As an alternative to this, a higher pretension can also be achieved by introducing one or more simple spacer elements into the depressions or channels 7*a*, 7*b*, 7*c*, 7*d*, 7*e*; 8*a*, 8*b*, 8*c*, 8*d*, 8*e* in the form of half shells of one or more attachments 19, 20, 21, 22.

LIST OF REFERENCE SIGNS

1 Object, fuel cell stack
2.2 First individual cell

2.2 Second individual cell
3 Stacking and pretensioning direction
4 First, upper end plate
5 Second, lower end plate
6 Tensioning and holding apparatus
7 First attachment, on the first end plate
7.1 First transverse web of the first attachment 7
7.2 Second transverse web of the first attachment 7
7.3 Third transverse web of the first attachment 7
7.4 Fourth transverse web of the first attachment 7
7.5 Fifth transverse web of the first attachment 7
**7*a* Channel in the transverse web 7.1**
**7*b* Channel in the transverse web 7.2**
**7*c* Channel in the transverse web 7.3**
**7*d* Channel in the transverse web 7.4**
**7*e* Channel in the transverse web 7.5**
8 Second attachment, on the first end plate
8.1 First transverse web of the second attachment 8
8.2 Second transverse web of the second attachment 8
8.3 Third transverse web of the second attachment 8
8.4 Fourth transverse web of the second attachment 8
8.5 Fifth transverse web of the second attachment 8
**8*a* Channel in the transverse web 8.1**
**8*b* Channel in the transverse web 8.2**
**8*c* Channel in the transverse web 8.3**
**8*d* Channel in the transverse web 8.4**
**8*e* Channel in the transverse web 8.5**
**10*a* First cutout, on the first attachment 7**
**10*b* Second cutout, on the first attachment 7**
**11*a* Third cutout, on the second attachment 8**
**11*b* Fourth cutout, on the second attachment 8**
**12*a*** First tensioning means, on the first and third holding rod
**12*b*** Second tensioning means, on the first and third holding rod
**13*a*** Third tensioning means, on the second and fourth holding rod
**13*b*** Fourth tensioning means, on the second and fourth holding rod
14 Third attachment, on the second end plate
14.1 First transverse web of the third attachment 14
14.2 Second transverse web of the third attachment 14
14.3 Third transverse web of the third attachment 14
14.4 Fourth transverse web of the third attachment 14
14.5 Fifth transverse web of the third attachment 14
15 Fourth attachment, on the second end plate
15.1 First transverse web of the fourth attachment 15
15.2 Second transverse web of the fourth attachment 15
15.3 Third transverse web of the fourth attachment 15
15.4 Fourth transverse web of the fourth attachment 15
15.5 Fifth transverse web of the fourth attachment 15
**15*a* First channel, in the first transverse web 15.1**
**17*a* Fifth cutout, on the third attachment 14**
**17*b* Sixth cutout, on the third attachment 14**
**18*a* Seventh cutout, on the fourth attachment 15**
**18*b* Eighth cutout, on the fourth attachment 15**
19 First, upper holding rod
20 Second, upper holding rod
21 First, lower holding rod
22 Second, lower holding rod
23 First mounting tool
24 Second mounting tool
25 Normal force

The invention claimed is:

1. A tensioning and holding apparatus for a fuel cell stack, the apparatus comprising:
- a tensioning belt having a fixed pretensioning;
- first and second end plates;
- an endplate of the first and second end plates comprises attachments that extend perpendicular to a pretensioning direction and parallel to one another;
- the attachments configured to receive respective associated holding rods;
- the attachments laterally protrude from the end plate;
- the attachments have cutouts in their longitudinal direction for guiding the tensioning belt to wrap around the holding rods;
- the holding rods are in force-fitting engagement with the attachments in a pretensioned state;
- the first and second end plates are braced against one another by the tensioning belt.

2. The apparatus of claim 1, the tensioning belt wraps around the first end plate.

3. The apparatus of claim 1, the end plate has a surface region having a guiding aid.

4. The apparatus of claim 3, the guiding aid comprising a guide rail.

5. The apparatus of claim 3, the guiding aid comprising a curved surface rounded in an edge region of the end plate.

6. The apparatus of claim 1, the tensioning belt is an endless belt.

7. The apparatus of claim 1, a holding rod of the holding rods is in the form of a shaft with an eccentric cross section, the holding rod is configured to be rotated about its longitudinal axis and fixed in a rotated position to increase or reduce a tensile force on the fuel stack.

8. The apparatus of claim 7, further comprising a spacer for retensioning the fuel stack, the spacer inserted between a depression or channel of the attachments and the holding rod.

9. A method of mounting a tensioning belt and holding apparatus on a fuel cell stack, the method comprising:
- placing a tensioning belt resting on a first upper holding rod onto a channel-like mounting tool;
- placing the tensioning belt on a second upper holding rod onto a second channel-like mounting tool;
- inserting the first and second upper holding rods into a first attachment and a second attachment;
- applying force to an end plate to pretension a fuel cell stack;
- inserting the channel-like mounting tool carrying the tensioning belt at a second end plate into a third attachment;
- inserting the second channel-like mounting tool carrying the tensioning belt into a fourth attachment at the second end plate;
- introducing a first lower holding rod into the first mounting tool and a second lower holding rod into the second mounting tool;
- removing the first and second mounting tools; and
- relieving the force on the end plate.

* * * * *